Dec. 15, 1925.
J. E. BODA
1,565,619
CLUTCH
Filed Feb. 9, 1922   5 Sheets-Sheet 1
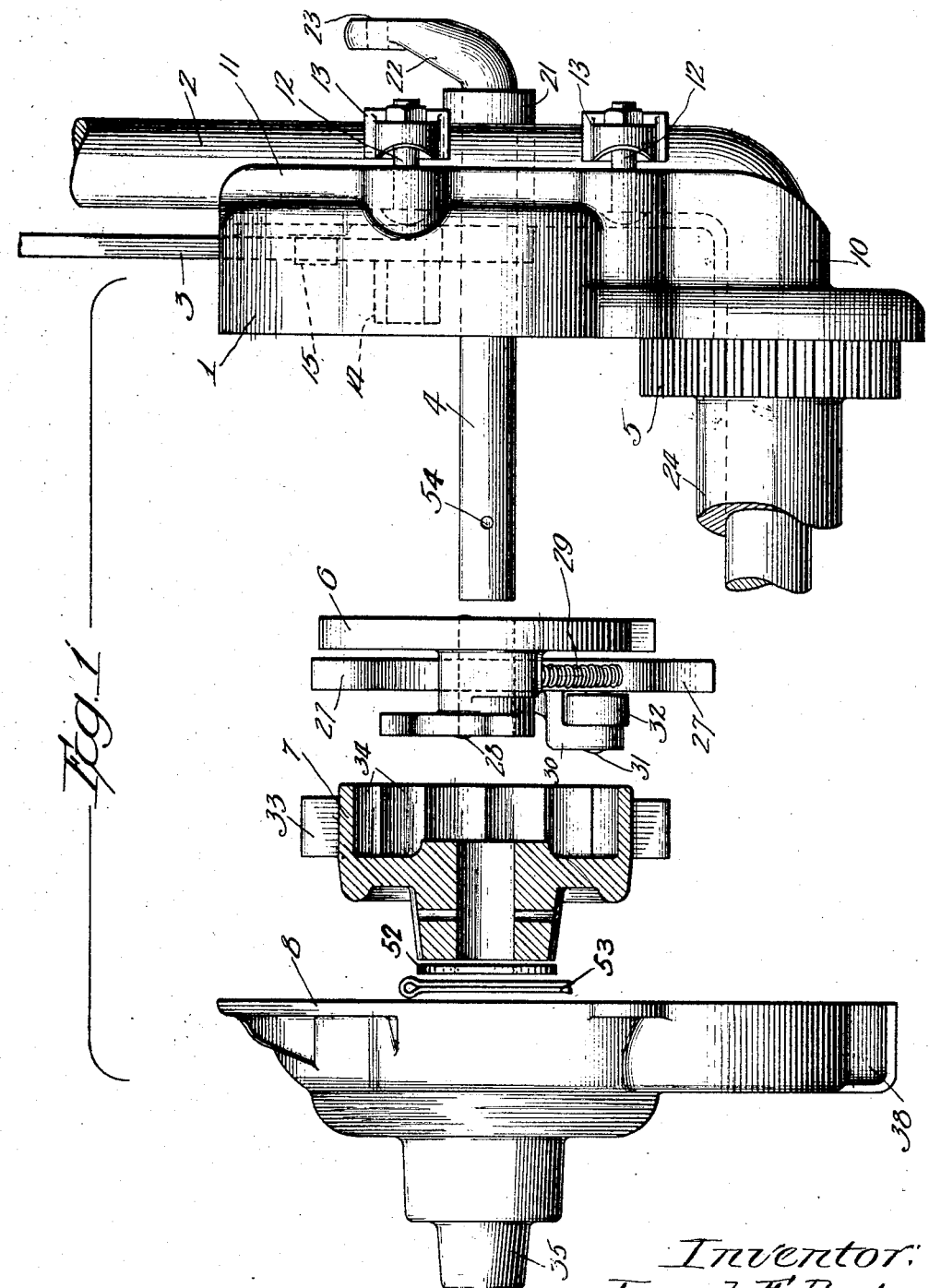
Inventor:
Joseph E. Boda
L. C. Shouts Atty

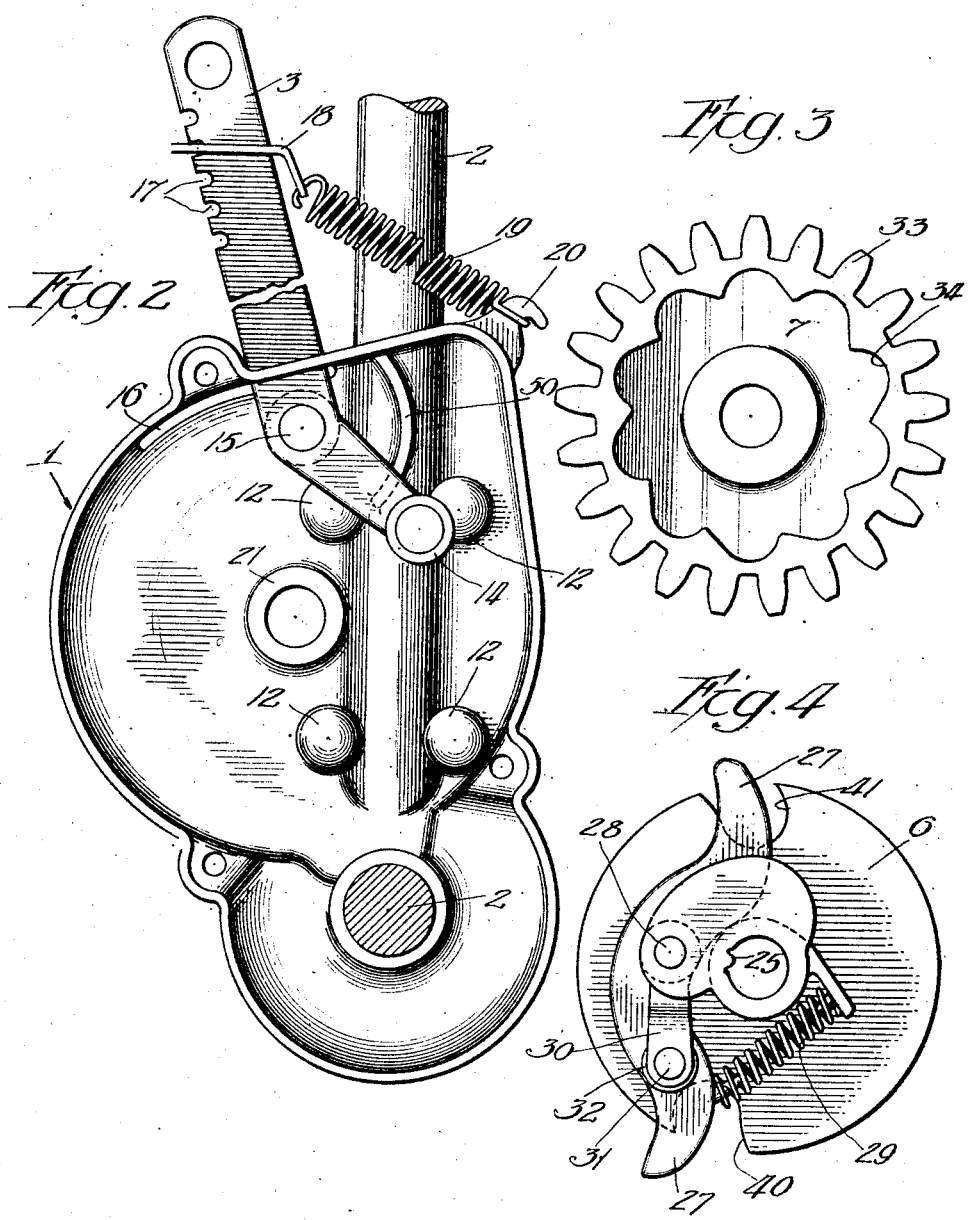

Dec. 15, 1925.  
J. E. BODA  
CLUTCH  
Filed Feb. 9, 1922  
1,565,619  
5 Sheets-Sheet 3
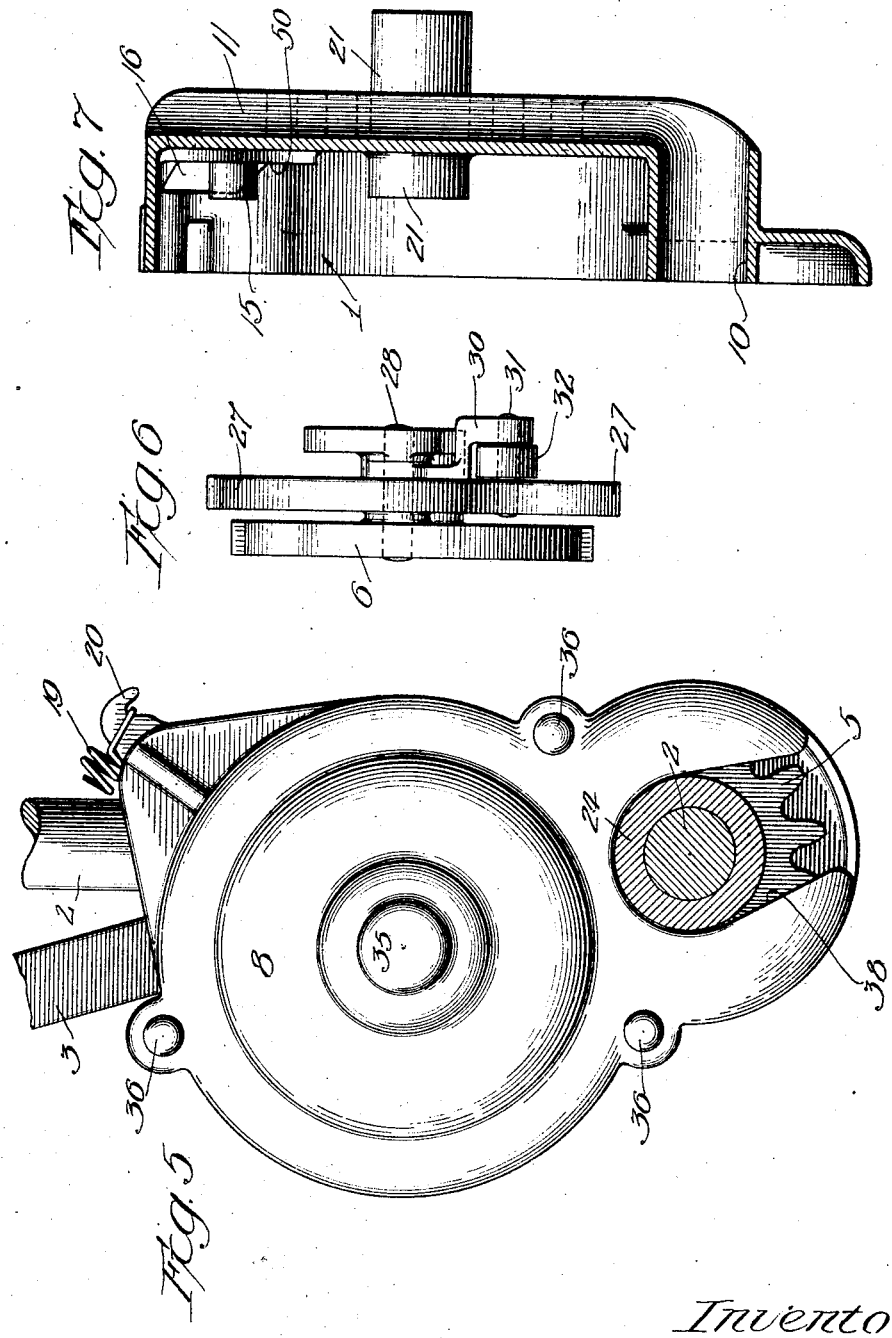
Inventor:
Joseph E. Boda

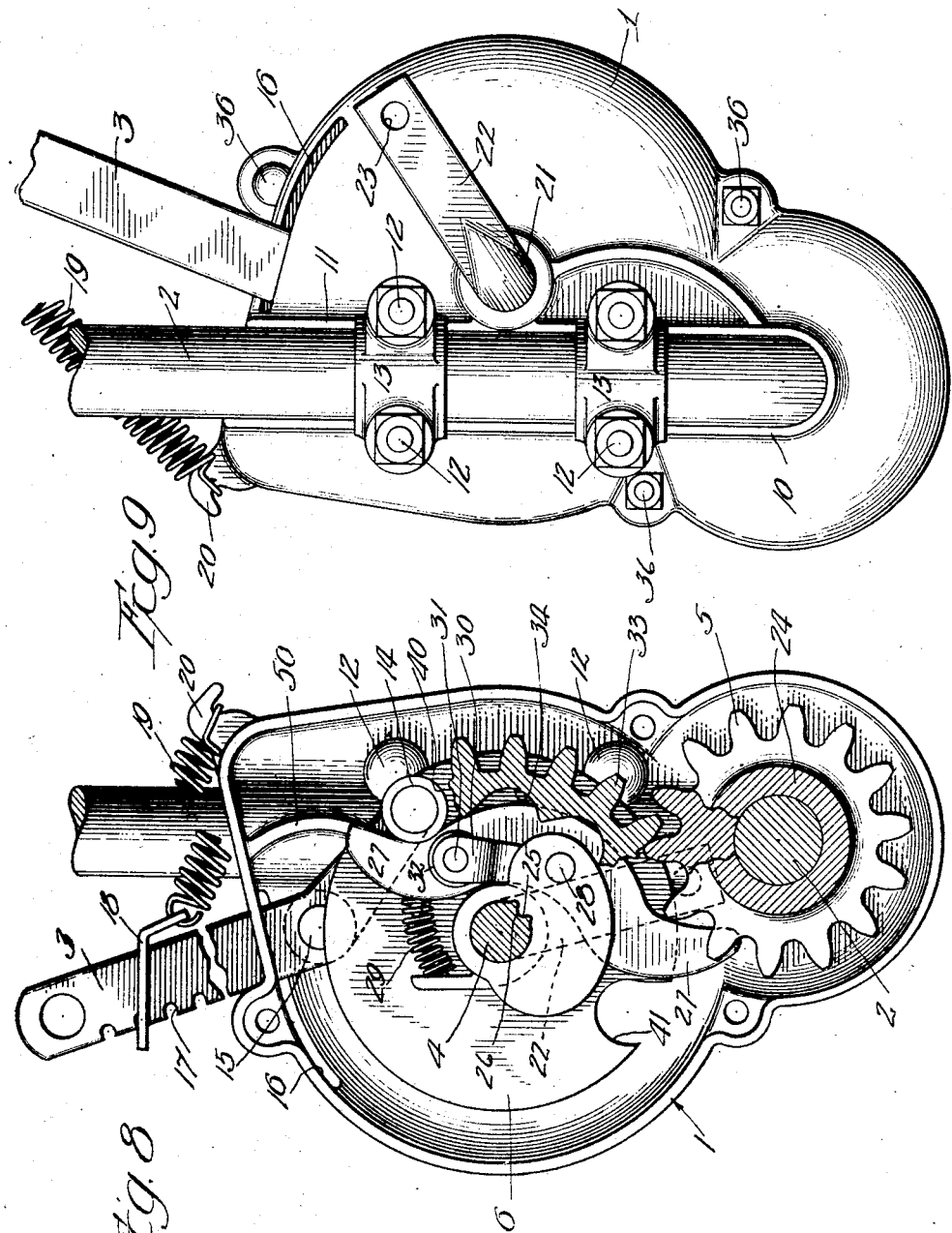

Dec. 15, 1925.
J. E. BODA
1,565,619
CLUTCH
Filed Feb. 9, 1922
5 Sheets-Sheet 5

Inventor;
Joseph E. Boda

Patented Dec. 15, 1925.

1,565,619

UNITED STATES PATENT OFFICE.

JOSEPH E. BODA, OF MOLINE, ILLINOIS, ASSIGNOR, BY MESNE ASSIGNMENTS, TO MOLINE IMPLEMENT COMPANY, A CORPORATION OF ILLINOIS.

CLUTCH.

Application filed February 9, 1922. Serial No. 535,130.

*To all whom it may concern:*

Be it known that I, JOSEPH E. BODA, a citizen of the United States, residing at 2115 16th Street, Moline, county of Rock Island, State of Illinois, have invented certain new and useful Improvements in Clutches, of which the following is a specification.

The invention relates to clutches.

It relates particularly to implement clutches and is illustrated as used with powerlift plows.

It is desirable, in a clutch of this type, to have the parts as few as possible, to have each part as simple as it can be made, to have the relation of the parts as self-evident as possible so as to facilitate assembling and repair, to have all the parts durable, to have all parts enclosed so as to prevent dirt getting into the clutch and so as to enclose lubricant, and at the same time to have a clutch that will be efficient in operation under all the varying and difficult conditions to which such a device is subjected. The problem involves production methods as well as mechanical construction. The present invention has been devised to achieve all these desirable results.

The general object is to provide an improved clutch construction.

More specifically, the object is to provide an improved and simplified implement clutch that can be inexpensively produced.

Other objects and advantages of the invention will appear from the specification and drawings.

An embodiment of the invention is illustrated in the drawings in which,

Figure 1 is a separated view showing the clutch elements in end elevation with the exception of one which is shown in cross section.

Figure 2 is a side elevation looking into the interior of one portion of the clutch housing.

Figure 3 is a side elevation of the clutch disk.

Figure 4 is a side elevation of the clutch dog plate.

Figure 5 is a side elevation of one side of the clutch.

Figure 6 is an end elevation of the dog plate.

Figure 7 is a cross section of one portion of the clutch housing.

Figure 8 is a side elevation of the clutch with a portion of the housing removed and certain of the clutch parts broken away.

Figure 9 is a side elevation of the side of the clutch opposite to that illustrated in Figure 5.

Figures 10, 11, 12:
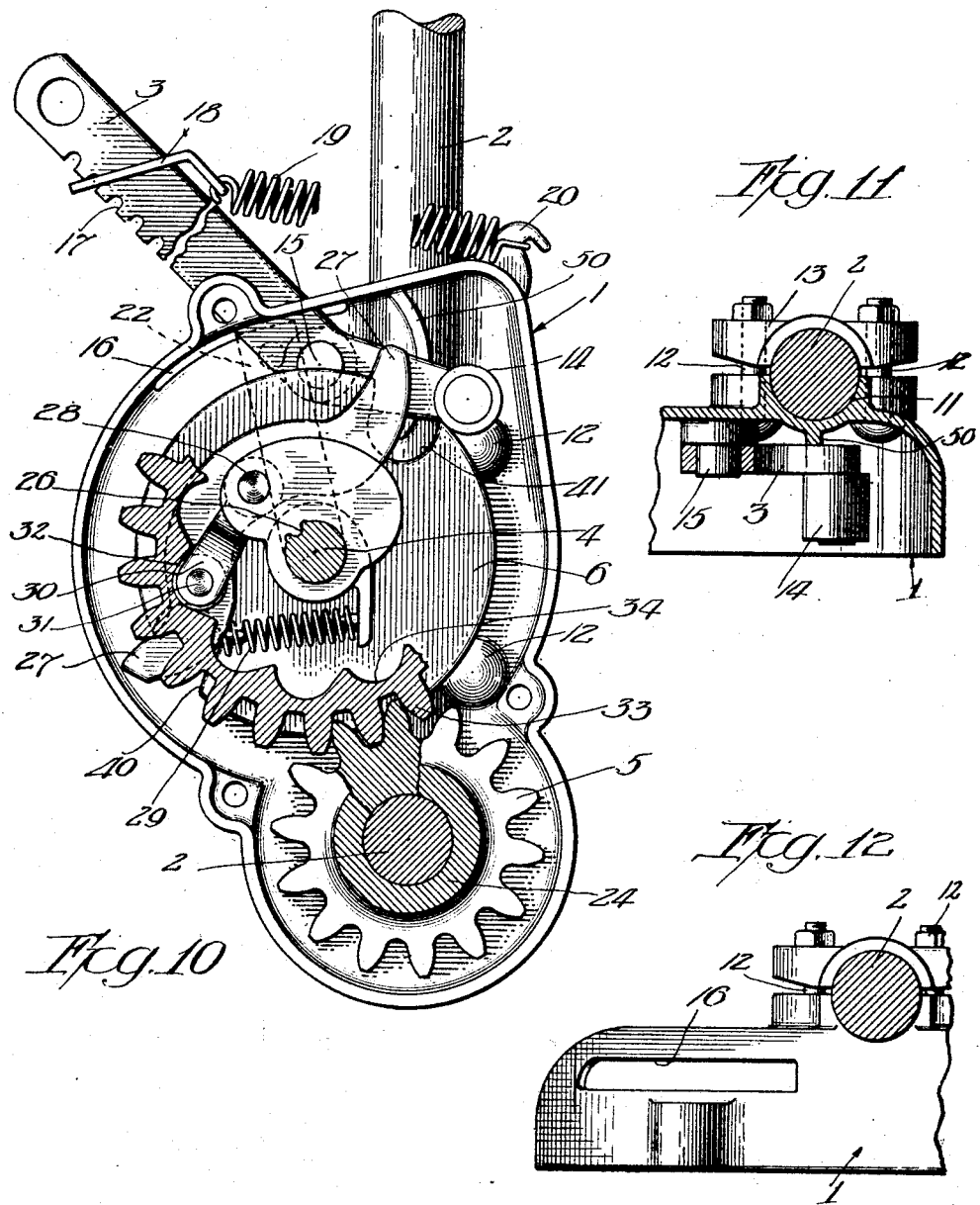
Figure 10 is a side elevation similar to Figure 8, but with the clutch parts in a different position.
Figure 11 is a cross section of a detail of the clutch showing the housing and the method of mounting the tripping lever therein.
Figure 12 is a plan view of a detail of the clutch housing showing the slot through which the tripping lever projects.

The clutch comprises, in general, (see Fig. 1) a housing member 1 arranged to be attached to the crank axle 2 of a plow, a trip lever 3, a stub shaft 4, a driving gear 5, a dog plate 6, a clutch disk 7 and a second housing member 8 arranged to be fastened to the first housing member to enclose the parts.

The crank axle 2 is of the usual construction employed in agricultural implements, particularly plows. Crank axles of this type are pivoted to the implement and swung back and forth relative to it by powerlift mechanism to raise and lower the implement.

The housing member 1 is preferably mounted at the bend in the crank axle and, for this purpose, it has a bearing 10 for receiving the crank wrist of the crank axle 2 and a semi-circular recess 11 for receiving the upright portion or arm of the crank axle. The housing is clamped in position around the arm of the axle by bolts 12 and clamping plates 13. It is thus held very firmly, that is, it cannot move endwise, because it is locked to the wrist of the crank axle; it cannot move sidewise, because it is bolted tightly in place around the arm of the crank axle; and it cannot twist, both because it is clamped tightly in place, and, because there are two separated bearing points, namely, the line of contact with the arm of the crank axle and the line of contact with the wrist pin. The housing member is put in place by slipping it over the end of the crank wrist and then bolting it to the crank axle arm.

The trip lever 3 is a bent lever carrying a latch roller 14 on one of its ends. It is mounted upon a stud 15 integral with the housing member 1. The other end of the lever extends through a slot 16 in the housing (see Figs. 8 and 12) and has a number of notches 17 in it with which cooperates an adjustable catch 18 to which is connected one end of a spring 19, the other end of the spring being connected to a hook 20 on the housing 1. The spring serves to normally bias the tripping lever in a clockwise direction as viewed in Figure 8.

The stub shaft 4 is journaled in a bearing 21 in the housing member 1. It has a crank 22 on one end provided with an opening 23 for the reception of a bolt or other fastening device for connecting it by a link or the like to the mechanism to be raised, which, in this case, is a plow frame.

The driving gear 5 is journaled on the wrist pin of the crank axle and contained partly within the housing member 1. In the clutch illustrated, this gear has a sleeve 24 for connecting it with the land wheel of a plow which rotates the gear continuously with the land wheel as the plow travels over the ground.

The dog plate 6 is slipped over the end of the stub shaft 4 when the clutch is assembled and is fixed to that shaft. For this purpose, there is formed integral with the dog plate a key 25 illustrated in Figure 4, which fits into a key slot 26 in the stub shaft (see Fig. 10). The dog plate carries a dog 27 pivoted to it at the point 28 and normally biased by a spring 29 in a clockwise direction as viewed in Figures 4, 8 and 10. The dog has a spaced arm 30 between one end of which and the dog is a shaft 31 carrying a locking roller 32 adapted to coact with notches in the clutch disk 7.

The clutch disk 7 comprises an annular gear having teeth 33 on its outer surface which mesh with the teeth on the driving gear 5, and notches 34 on its inner surface for cooperation with the roller 32 of the dog 27. The clutch disk is loosely journaled on stub shaft 4 and rotates continuously with the driving gear 5.

The complementary housing member 8 has a bearing 35 in which fits the left hand end of stub shaft 4 as viewed in Figure 1. The member 8 is bolted or clamped to the housing member 1 by bolts 36 and, when so positioned, the housing members completely enclose the parts. The lower end of the housing member 8 has a slot 38 that fits over the sleeve 24 attached to the driving gear 5.

The cooperation of these clutch parts is as follows:

When the parts are in the position shown in Figure 8, the clutch is in one of its non-operating positions. In this position, the latch roller 14 is in a notch 40 in the dog plate and in contact with one end of the dog. The latch roller 14 holds the dog in such position that the locking roller 32 is out of engagement with the notches 34 in the clutch disk 7. The spring 29 tends to bias the dog to cause the roller 32 to engage the notches 34, but such action is prevented because the latch roller 14 is held in engagement with the dog by means of the spring 19 which is stronger than the spring 29. If, with the parts in the position shown in Figure 8, the upper end of the lever 3 is moved to the left, the latch roller 14 is moved upwardly out of the path of dog 27, which, thereupon moves in a clockwise direction throwing locking roller 32 into engagement with one of the notches 34 in the clutch disk 7, the latter being continuously rotated in a counter-clockwise direction as viewed in Figure 8. When the roller engages one of the notches, the dog plate is locked to the clutch disk and rotates with it in a counter-clockwise direction, thereby rotating the stub shaft 4 and its crank 22. As soon as this movement starts, the notch 40 passes beyond the position of latch roller 14, and, even though pressure is relieved from the upper end of lever 17, it, nevertheless, can not move back to its original position, because, the roller 14 rides upon the periphery of the dog plate until the parts have rotated to such a position that a second notch 41 on the edge of the dog plate comes opposite the roller 14, whereupon the roller will drop into the notch 41, engage the end of the dog, and throw the locking roller 32 out of engagement with its notch 34 in the clutch disk. This disconnects the dog plate from the clutch disk and stops the clutch.

When the lever 3 is again pulled, the clutch action is repeated, that is, the clutch is engaged and it continues to rotate through a predetermined cycle until it is automatically stopped. The position of the lever 3 and its roller 14 just after leaving the notch 41 in the dog plate is illustrated in Figure 10.

The number and location of the notches 40 and 41 may be varied to suit the requirements for different cycles of movement. In the particular case illustrated the clutch moves more than a half revolution during one movement and less than a half revolution during its next movement.

One of the important features of this clutch is the facility with which it may be assembled and the small number of parts required to complete the assembly. For example, the housing member 1 is first clamped in place by simply slipping it over the crank axle 2 and bolting it in position with the two simple clamps illustrated. The construction is such that this can be easily done, and at the same time, the housing member is held very rigidly in position.

The tripping lever 3 is then put in position by inserting one end through the slot 16 in the housing and slipping the hole in the lever over the pivot 15. No cotters, lock-nuts, or other devices are necessary, because the lever is held in position by the other parts. In order to prevent the lever from wobbling, it is backed by a rib 50 illustrated in Figure 2. The surface of this rib is the same height above the back side of the housing member as the rear portion of the bearing pivot 15, so that the lever is spaced from the back of the housing member in all its adjusted positions. The roller 14 may either be assembled on the lever at the time it is made or it may be slipped on the bent end of the lever after it is in the housing.

The stub shaft 4 is next positioned in the bearing 21 in the housing by simply sliding the shaft into position. The dog plate 6 is then slid on to the end of the stub shaft, the integral key in the dog plate fitting into the key-way in the stub shaft. The dog plate is moved to the right as viewed in Figure 1 until its surface contacts the flat side of the tripping lever 3, which should be manipulated so that the roller 14 will be in one of the slots 40 or 41 in the dog plate.

The clutch disk 7 is then slid on to the end of the stub shaft and into contact with the dog plate. This disk is held in position by a washer 52 and cotter pin 53, the latter being inserted through the hole 54 in the stub shaft.

The housing member 8 is then placed in position and bolted to its complementary member 1.

The parts are thus all held in position and completely enclosed. No complicated devices are necessary for assembling and only one washer and cotter pin are used in addition to the clamps for clamping the housing member to the crank shaft and there are only two of these.

It is to be understood that the construction shown is for purposes of illustration only and that variations may be made therein without departing from the spirit and scope of the appended claims.

I claim:

1. The combination with an agricultural implement crank axle having an arm and a crank wrist upon which a ground wheel may be journalled, of a power lift mechanism comprising a compact unit located adjacent the bend in the crank axle and on the inside thereof so that it will be between the crank axle arm and a ground wheel journalled on the crank wrist, said mechanism including a housing member clamped to the crank axle arm adjacent the wrist, a stub shaft journalled at one end in said housing member, a dog plate fixed to the stub shaft and housed by said housing member, a clutch disk journalled on said stub shaft, a driving gear on the crank wrist meshing with the clutch disk, and a complementary housing member forming a bearing for the other end of the stub shaft and adapted to be attached to the first housing member to enclose all of said parts.

2. A powerlift mechanism for implements having a housing member, a stub shaft journalled at one end in said housing member, a dog plate fixed to the stub shaft and housed by the housing member, a clutch disk loosely journalled on the stub shaft, a driving gear for driving the clutch disk, a complementary housing member forming a bearing for the other end of the stub shaft and attached to the first housing member to enclose the parts, a tripping lever extending into the housing and pivoted on a pivot integral with one of said housing members, said lever being held in position on its pivot by the dog plate and a projecting rib on the housing member.

3. A clutch for implements comprising a housing member, a stub shaft journaled at one end in said housing member, a keyway in said stub shaft, a dog plate fixed to said stub shaft, said plate having a key formed integral therewith which cooperates with the key-way in the stub shaft, a clutch plate journaled loosely on the stub shaft, a driving gear, and a complementary housing member forming a bearing for the other end of the stub shaft and connected to the first housing member to enclose the clutch parts.

4. A clutch for implements comprising a housing member, a tripping lever pivoted on a pivot integral with said housing member and having a portion extending through an opening in the housing member, a stub shaft having one end journalled in a bearing in said housing member, a dog plate fixed on said stub shaft, said dog plate having an integral key cooperating with a keyway in the stub shaft, a clutch plate loosely journaled on the stub shaft, a driving gear, and a complementary housing member forming a bearing for the other end of the stub shaft and cooperating with the first housing member to enclose the clutch parts.

5. A clutch for implements having a housing member, a trip lever adapted to be inserted through an opening in the housing member and slipped over a pivot on the housing member, whereby the trip lever is mounted in the housing member with a portion extending outside, a stub shaft having a crank on one end and readily insertable in a bearing in the housing member, a dog plate adapted to be slipped over the end of the stub shaft into cooperative relation with the trip lever, said dog plate having a key cast integral therewith adapted to fit a key-way in the stub shaft, a clutch plate readily mountable on the stub shaft adjacent the dog plate and in cooperative relation therewith, a driving gear, and a complementary housing member having a portion forming a bearing for the end of the stub shaft opposite the cranked end and cooperating with the first housing member to enclose the parts.

In testimony whereof, I affix my signature.

JOSEPH E. BODA.